US007527469B2

(12) United States Patent
Zborovsky et al.

(10) Patent No.: US 7,527,469 B2
(45) Date of Patent: May 5, 2009

(54) TRANSITION-TO-TURBINE SEAL APPARATUS AND KIT FOR TRANSITION/TURBINE JUNCTION OF A GAS TURBINE ENGINE (75) Inventors: James M. Zborovsky, Orlando, FL (US); Johan Hsu, Orlando, FL (US); Andrew G. McQuiggan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 504 days.

(21) Appl. No.: 11/298,320

(22) Filed: Dec. 8, 2005

(65) Prior Publication Data
US 2006/0123797 A1 Jun. 15, 2006

Related U.S. Application Data (60) Provisional application No. 60/635,028, filed on Dec. 10, 2004.

(51) Int. Cl.
F01D 25/00 (2006.01)
(52) U.S. Cl. ............... 415/9; 415/110; 415/137; 415/138; 415/191; 277/412
(58) Field of Classification Search ............ 415/9, 415/92, 110, 136, 137, 138, 191, 199.5; 277/411, 412, 413
See application file for complete search history.

(56) References Cited

U.S. PATENT DOCUMENTS

| 2,859,934 | A | * | 11/1958 | Halford et al. | ............. 415/115 |
| 2,984,454 | A | * | 5/1961 | Fiori | .................... 415/117 |
| 3,965,066 | A | * | 6/1976 | Sterman et al. | ............... 60/800 |
| 3,986,720 | A | * | 10/1976 | Knudsen et al. | ............. 277/411 |
| 4,029,432 | A | | 6/1977 | Meylan et al. | |
| 4,232,527 | A | | 11/1980 | Reider | |
| 4,300,868 | A | * | 11/1981 | Wilkinson et al. | ........... 415/137 |
| 4,552,509 | A | | 11/1985 | Schweikl et al. | |
| 4,566,851 | A | * | 1/1986 | Comeau et al. | ............. 415/139 |
| 4,706,453 | A | | 11/1987 | Vivace | |
| 4,747,750 | A | | 5/1988 | Chlus et al. | |
| 5,125,796 | A | | 6/1992 | Cromer | |
| 5,265,412 | A | | 11/1993 | Bagepalli et al. | |
| 5,398,496 | A | * | 3/1995 | Taylor et al. | ................. 60/796 |
| 5,407,237 | A | | 4/1995 | Smolowitz | |
| 5,407,319 | A | * | 4/1995 | Harrogate et al. | ........... 415/115 |
| 5,417,545 | A | * | 5/1995 | Harrogate | .................. 415/115 |
| 5,749,218 | A | | 5/1998 | Cromer et al. | |

(Continued)

*Primary Examiner*—Edward Look
*Assistant Examiner*—Aaron R Eastman (57) ABSTRACT One embodiment of a transition-to-turbine seal (300) comprises a transition exit seal (302) adapted for fixed attachment to an exit rail (350) of a transition (109), and a stage-1 seal (340). The stage-1 seal (340) comprises an axial seal slot (348) comprising parallel walls (346, 347) adapted to slidingly engage a first male member (310) of the transition exit seal (302). The stage-1 seal (340) also comprises a radial seal slot (354) comprising parallel walls (351, 353) adapted to slidingly engage a plate (338) of a row 1 vane segment (330). The transition-to-turbine seal (300) thus provides both axial and radial freedom of movement. Materials and coatings for the transition exit seal (302) and the stage-1 seal (340) are selected to promote preferential wear of these components relative to wear of the surface of the row 1 vane segment (330). Wear of the exit rail (350) is reduced or eliminated due to the noted fixed attachment.

20 Claims, 8 Drawing Sheets

U.S. PATENT DOCUMENTS

| | | | |
|---|---|---|---|
| 6,109,663 A | 8/2000 | Hayton | |
| 6,155,574 A * | 12/2000 | Borgstrom et al. | 277/419 |
| 6,312,215 B1 * | 11/2001 | Walker | 415/9 |
| 6,345,494 B1 | 2/2002 | Coslow | |
| 6,435,820 B1 * | 8/2002 | Overberg | 415/138 |
| 6,450,762 B1 | 9/2002 | Munshi | |
| 6,588,214 B2 | 7/2003 | Mack et al. | |
| 6,648,336 B1 * | 11/2003 | Kostrzewsky et al. | 277/549 |
| 6,751,962 B1 * | 6/2004 | Kuwabara et al. | 60/800 |
| 6,797,408 B2 * | 9/2004 | Walston et al. | 428/632 |
| 6,834,507 B2 | 12/2004 | Jorgensen | |
| 2004/0031271 A1 | 2/2004 | Jorgensen | |
| 2005/0095122 A1 | 5/2005 | Friedl et al. | |

* cited by examiner

TRANSITION-TO-TURBINE SEAL APPARATUS AND KIT FOR TRANSITION/TURBINE JUNCTION OF A GAS TURBINE ENGINE

RELATED APPLICATIONS

This application claims the benefit of U.S. Provisional Application No. 60/635,028, filed Dec. 10, 2004. This provisional application is incorporated by reference.

FIELD OF INVENTION

The invention generally relates to a gas turbine engine, and more particularly to a seal between a transition and a turbine of such engine.

BACKGROUND OF THE INVENTION

In gas turbine engines, air is compressed at an initial stage, then is heated in combustion chambers, and the hot gas so produced passes to a turbine that, driven by the hot gas, does work which may include rotating the air compressor.

In a typical industrial gas turbine engine a number of combustion chambers combust fuel and hot gas flowing from these combustion chambers is passed via respective transitions (also referred to by some in the field as ducts) to respective entrances of the turbine. More specifically, a plurality of combustion chambers commonly are arranged radially about a longitudinal axis of the gas turbine engine, and likewise radially arranged transitions comprise outlet ends that converge to form an annular inflow of hot gas to the turbine entrance. Each transition exit is joined by a seal to one or more turbine components, which in various designs are known as row 1 vane segments. Adjacent component growth variances due to thermal expansion, thermal stresses, and vibrational forces from combustion dynamics all affect design criteria and performance of such a seal, referred to herein as a transition-to-turbine seal. Consequently, the design of such seal has presented a challenge that resulted in various approaches that attempt to find a suitable balance between seal cost, reliability, durability, installation and repair ease, performance, and effect on adjacent components.

For example, U.S. Pat. No. 5,265,412, issued Nov. 30, 1993 to Bagepalli et al., teaches the use of flexible brush seals that are positioned between the transition and turbine entrance. An exemplary embodiment comprises a sealing cap solidly affixed to a first stage nozzle of the turbine, extending over a brush seal positioned at the end of the transition and an extending flexible brush radially outward to contact the adjacent sealing cap. An alternative embodiment provides the brush on the turbine component and the sealing cap extending from the transition (see FIG. 8). U.S. Pat. No. 5,749,218, issued May 12, 1998 to Cromer and Potter, illustrates a prior art flexible seal, one end of which fits into a U-shaped slot in the transition. The other end engages the first stage of the turbine. Recognizing a problem of wear in the U-shape slot, the '218 inventors solve this problem by inserting an insert into the slot that is comprised of a harder alloy than the metal forming the slot. This is stated to increase the effective wear resistance of the slot.

A number of other seal design approaches involve spring-loaded or formed seals, some with felt metal inserts. However, these are considered to involve unacceptable risks of failure or excessive wear, and/or difficulties with installation.

Each of the known approaches to transition-to-turbine seals has one or more factors that argue against its use in more advanced-design gas turbine engines. Thus, there remains a need for an improved transition-to-turbine seal.

BRIEF DESCRIPTION OF THE DRAWINGS

The invention is explained in following description in view of the drawings that show.

DETAILED DESCRIPTION OF THE INVENTION

Embodiments of the invention provide a number of advances over known transition-to-turbine seals, providing enhanced durability and lower wear rates of adjacent components. For example, in contrast to the approach of U.S. Pat. No. 5,749,218, to utilize harder metal inserts in a transition U-shaped slot, embodiments of the present invention eliminate wear on the transition at the seal interface. Also, various embodiments comprise consumable seal components that are relatively softer than more costly, adjacent parts. Motivation to preserve these adjacent parts (e.g., the transition and the row 1 vane segments) has become greater with the trend to increase firing temperature of gas turbine engines. Such increases in firing temperature are related to achieving desired emissions and operational efficiencies.

One approach is to construct components along the path of hot gases to have greater durability at higher temperatures, and this increases the cost of such components. Following such approach and given such higher costs for the transition and the row 1 vane segments, to tolerate such higher temperatures, the present inventors have recognized that one solution to sealing the junction between these parts is to provide a seal that is consumable yet that has a sufficient durability so as to not require frequent replacement, and that provides acceptable performance for other criteria. Achieving this with various embodiments of the present invention reduces or eliminates wear-related damage to the adjacent, more costly parts while reducing the overall costs related to sealing this junction.

Transition-to-turbine seal embodiments of the present invention comprise two major components—a transition exit seal adapted to solidly attach to a transition outlet, and a stage-1 seal adapted to engage both the transition exit seal and one or more row 1 vane segments of the turbine. This seal design accommodates axial and radial "sawtoothing" of the vane segments. More particularly, embodiments provide greater freedom of relative motion between adjacent row 1 vane segments in a gas turbine. This contributes to an increased freedom, and overall displacement capability, between the transition exit and the row 1 vane segments. The sawtoothing movement, which may be defined as the relative radial and axial displacement variation from vane segment to adjacent vane segment, reduces or eliminates wear to the adjacent seal surfaces due to fretting wear. Fretting wear is a major concern in gas turbine engine design and operations.

Embodiments also provide preferential wear of the stage-1 seal that extends the life of the relatively more costly row 1 vane segments. Also, the embodiments eliminate wear of the relatively more costly transition by solidly affixing a transition exit seal to the transition outlet, so that wear is on the consumable transition exit seal rather than the transition, such as the exit rail of the transition. Thus, embodiments of the invention comprise a consumable transition-to-turbine seal that provides axial and radial freedom to adjacent components without causing excessive wear on those adjacent parts. The seal components are renewable in that they may be replaced at desired intervals. Additional aspects of various embodiments are provided with and after discussion of specific embodiments that are depicted in the attached drawings.

Figure 1:
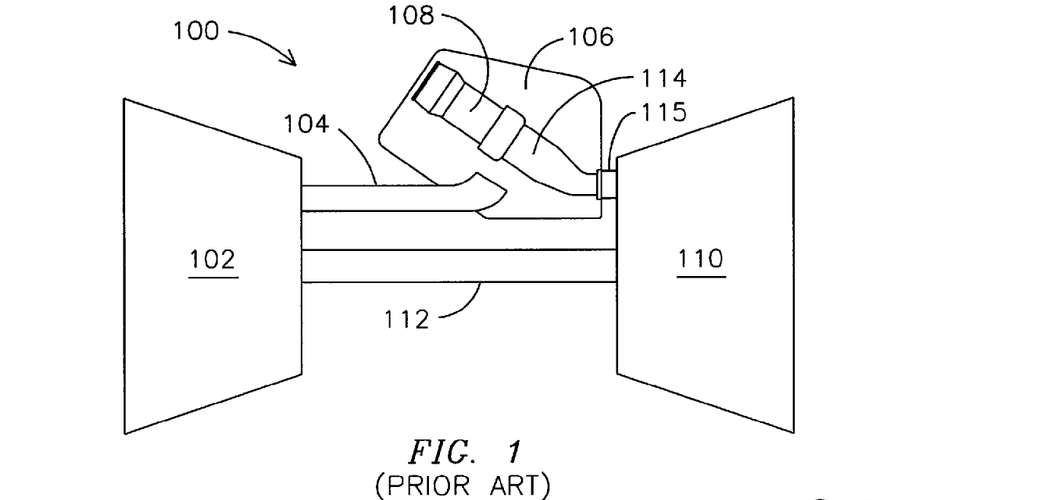
FIG. 1 provides a schematic cross-sectional depiction of a prior art gas turbine engine.

First, however, a discussion is provided of a common arrangement of elements of a prior art gas turbine engine. FIG. 1 provides a schematic cross-sectional depiction of a prior art gas turbine engine 100 such as may comprise various embodiments of the present invention. The gas turbine engine 100 comprises a compressor 102, a combustion chamber 108 (such as a can-annular combustion chamber), and a turbine 110. During operation, in axial flow series, compressor 102 takes in air and provides compressed air to a diffuser 104, which passes the compressed air to a plenum 106 through which the compressed air passes to the combustion chamber 108, which mixes the compressed air with fuel (not shown), providing combusted gases via a transition 114 to the turbine 110, which may generate electricity. A shaft 112 is shown connecting the turbine to drive the compressor 102. Although depicted schematically as a single longitudinal channel, the diffuser 104 extends annularly about the shaft 112 in typical gas turbine engines, as does the plenum 106. Air from the compressor 102 also travels to the turbine 110 by various channels (not shown in FIG. 1) to provide higher pressure air that surrounds and may enter the hot gas path as it passes through the turbine 110. A junction between the transition 114 and the turbine 110 is indicated by 115, and is the subject of further discussion herein.

Figure 2:
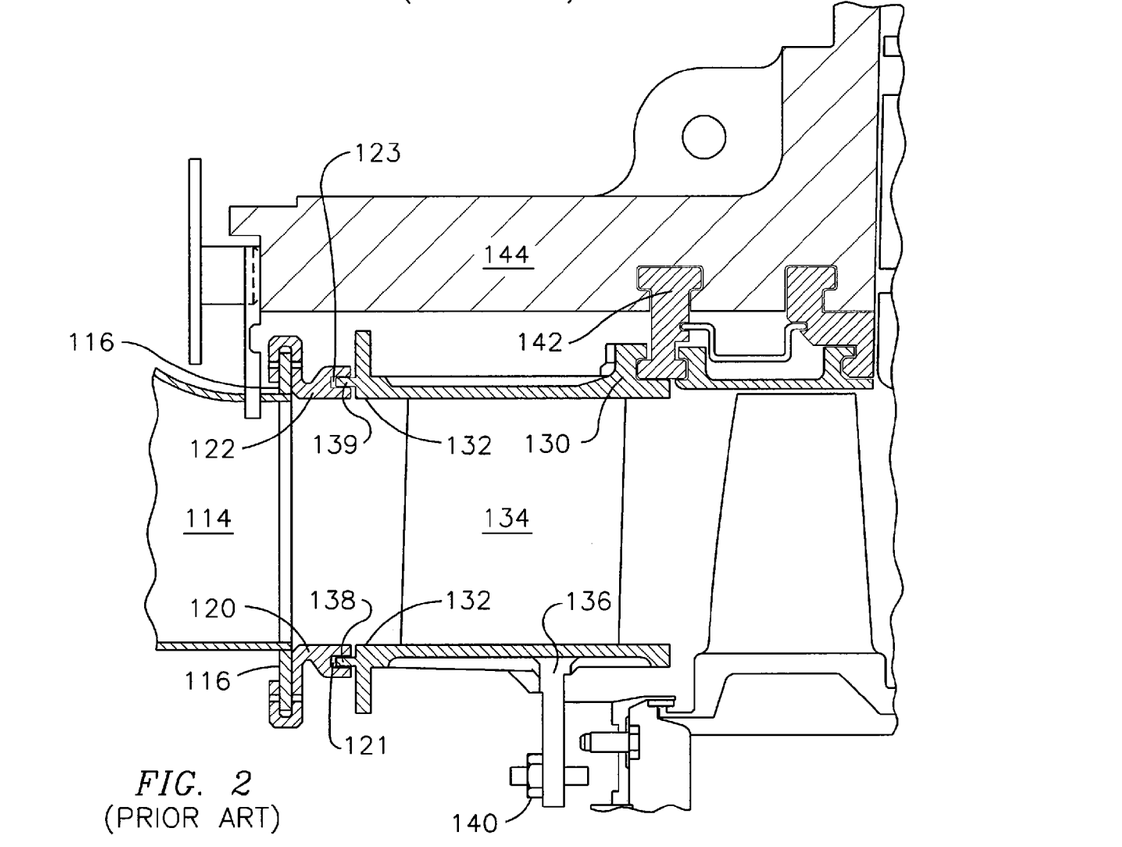
FIG. 2 provides a cross-sectional view of the junction of a transition with a front end of a turbine.

FIG. 2 provides a cross-sectional view of the junction of a transition with a front end of a turbine, such as would be found in FIG. 1 at 115. FIG. 2 depicts prior art inner and outer seals 120 and 122 for joining an exit rail 116 of transition 114 to a front end 132 of a row 1 vane segment 130. The row 1 vane segment 130 comprises a single airfoil 134 and is supported along an inner wall 136 by an inner vane attachment structure 140 and at a downstream outer end by an outer vane attachment structure 142 that connects to a row 1 turbine blade ring 144. At each of the forward inner and outer ends the row 1 vane segment 130 comprises a respective lip 138 and 139 that engages a slot 121 and 123 in the respective inner and outer mouth seals 120 and 122. Each such slot 121 and 123 provides for axial movement and limited radial movement. Wear on the exit rail 116 of transition 114 may occur during operation, in part as the seals 120 and 122 experience wear and tend to transfer more dynamic load.

Figure 3:
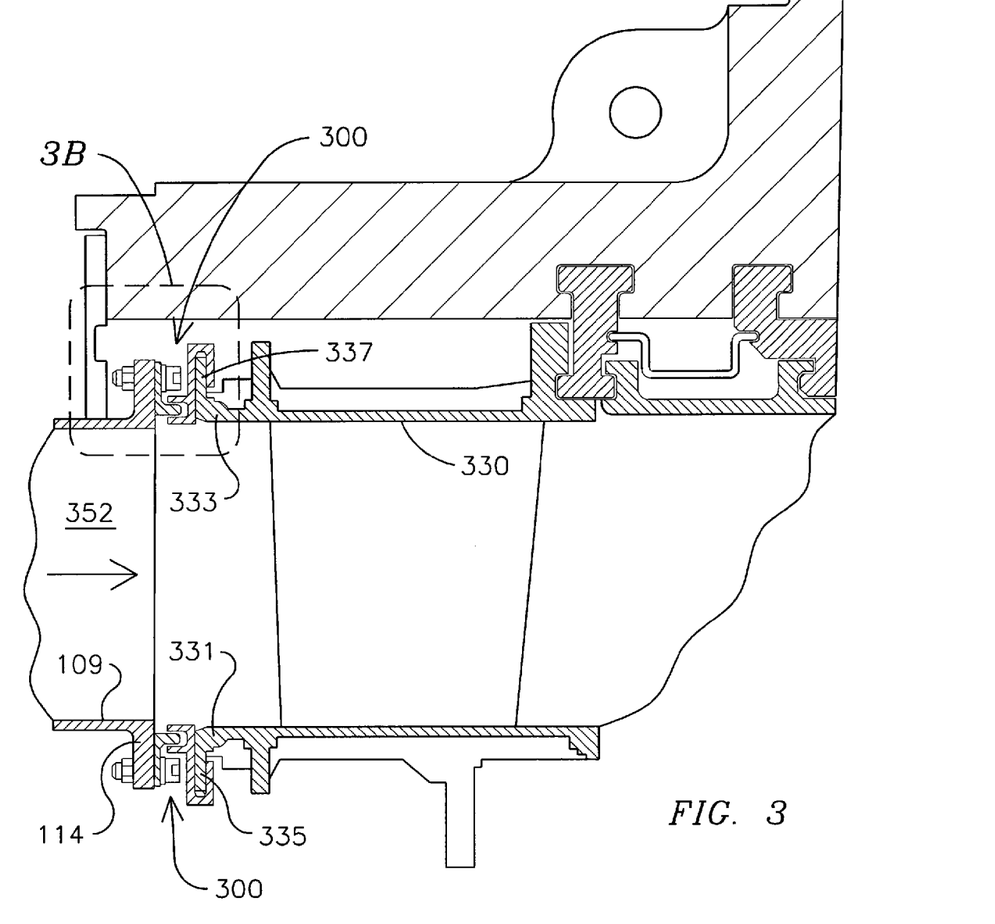
FIG. 3 provides a cross-section view of the junction of a transition with a front end of a turbine, depicting one embodiment of a transition-to-turbine seal of the present invention in such junction.

Various embodiments of the present invention advance the art, in part by isolating the transition from wear, and also by providing a consumable transition-to-turbine seal. FIG. 3 provides a cross-section view similar to the view of FIG. 2, however depicting one embodiment of a transition-to-turbine seal 300 of the present invention. As viewable in FIG. 3, a transition-to-turbine seal 300 is positioned at both inner and outer front ends 331 and 333 of a row 1 vane segment 330. Each end 331 and 333 comprises a respective leading edge rail 335 and 337 extending radially outward from a hot gas path 352 (direction indicated by arrow). The row 1 vane segment 330 also is referred to in the art as a "turbine inlet" and as a "first stage nozzle."

Figure 4:
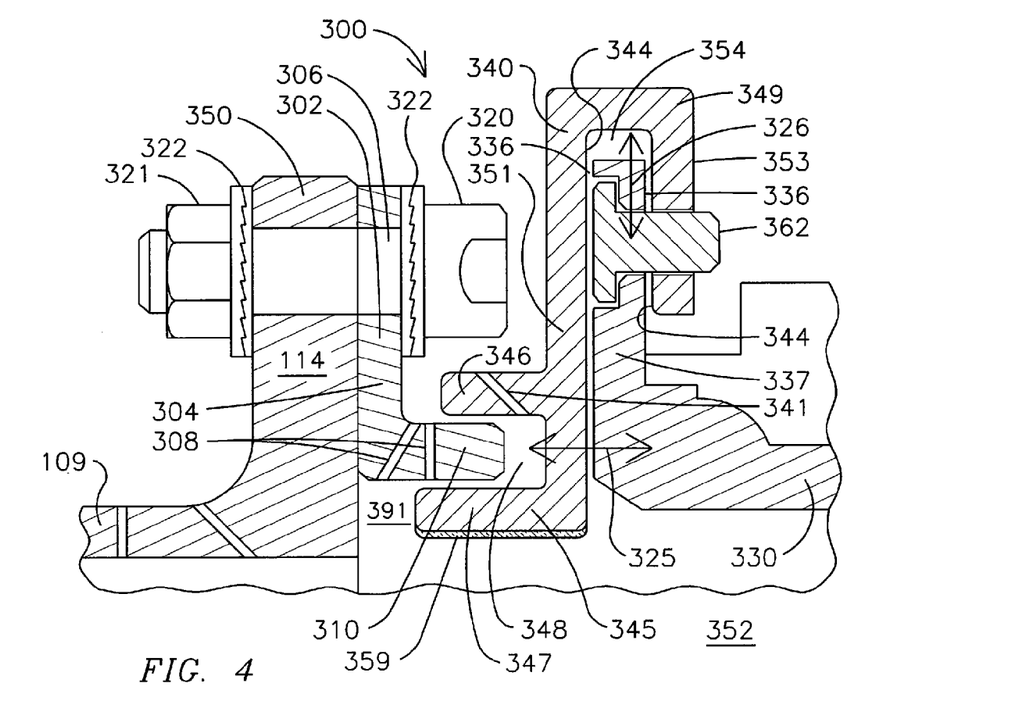
FIG. 4 provides an enlarged cross-sectional view of the region of FIG. 3 enclosed by dashed lines.

Aspects of the transition-to-turbine seal 300 are more clearly viewed in FIG. 4, which provides an enlarged cross-sectional view of the region of FIG. 3 enclosed by dashed lines. A transition exit seal 302, having an L-shape in cross section, comprises a plate 304 (alternatively referred to as a bar) adapted to affix to a transition exit rail 350, the plate 304 comprising one or more holes 306 for passage of a bolt 320 for stable attachment to the exit rail 350 with a nut 321 and washers 322. A first male member 310 (alternatively referred to as a bar) extends axially downstream and is adapted to engage a female member 345 of a stage-1 seal 340 that is a second major component of the transition-to-turbine seal 300.

Stage-1 seal 340 cooperatively associates with the transition exit seal 302 to provide a first sealing function that provides, as shown in FIG. 4, an axial freedom of movement. As depicted in FIG. 4, the axial movement (see arrow 325) is achieved by a sliding engagement of the first male member 310 with a first female member 345 of the stage-1 seal 340, which comprises two spaced apart parallel walls 346 and 347 defining an axial seal slot 348 there between. An optional thermal barrier coating 359 may be applied to the surface of wall 347 that is exposed to hot gas path 352. Stage-1 seal 340 also comprises a wear surface 344 adapted for sliding radial movement (see arrow 326) in relation to and contact with a surface 336 of a leading edge rail 337 of the row 1 vane segment 330. The leading edge rail 337 may alternatively be referred to as a bar, or a plate, as those terms are known to those skilled in the art. The wear surface 344 as depicted in FIG. 4 lies to both upstream and downstream sides of leading edge rail 337, and the surface 336 comprises both of the latter sides. The leading edge rail 337 is radially disposed relative to an axis defined by the gas turbine engine shaft (see shaft 112 of FIG. 1). This sliding radial contact provides a second sealing function, and radial freedom of movement to row 1 vane segments such as 330. In accordance with other terms used herein, as depicted in FIG. 4, a desired amount of radial movement is achieved by a sliding engagement of the leading edge rail 337 within a second female member 349 of the stage-1 seal 340. The second female member 349 comprises two spaced-apart parallel walls 351 and 353 defining a radial seal slot 354 there between. Wall 351 extends beyond the radial seal slot 354 toward the center of the row 1 vane segment 330 (i.e., toward hot gas path 352) to join the first female member 345.

The wear surface 344 of stage-1 seal 340 comprises a material selected to promote preferential wear of the wear surface 344 relative to wear of the adjacent surface 336 of the row 1 vane segment 330 during sliding contact there between. This may be accomplished, for example, by selection of a softer metal alloy for the stage-1 seal 340 compared with the hardness of the adjacent wear surface 336 of row 1 vane segment 330. This and other approaches for preferential wear, lubrication, and dedicated wear surfaces, as described elsewhere herein, and applicable to these and other components, surfaces, and paired surfaces, are believed to provide lower cost seals than currently used seals, when all cost factors (including scheduled repair and replacement events) are considered.

Spaced-apart effusion holes 308 and 341 are provided, respectively, on the transition exit seal 302 and the stage-1 seal 340. These provide for passage of cooling air from the compressor (not shown) to pass through such holes 308 and 341 and into the hot gas path 352. Further to the cooling functions of effusion holes generally, it is appreciated that concomitant with the design of various embodiments, a cavity 391 (such as depicted in FIG. 4) is formed adjacent the seal 300. Holes 308 and 341 not only provide a cooling air flow to provide a cooling effect on the transition exit seal 302, but, in various embodiments comprising such cavity 391, also provide a cooling air flow that is believed to avoid overheating of surfaces adjacent to cavity 391 (i.e., the surfaces of the transition exit rail 350 and the upstream end of wall 347 adjacent cavity 391). While in one regard it may be considered counterintuitive to design seal 300 to result in formation of a cavity such as 391, at an upstream position and subject to excessive heat buildup, it was ultimately perceived that the overall benefit of this design outweighed this counterintuitive aspect. Also related to overall cooling requirements, the design allowed for a shorter overall exposure distance along the hot gas path, thereby requiring less cooling, and this is counterbalanced by the need to provide sufficient cooling to the cavity 391 to maintain the temperature of the adjacent components below established temperature limits for a designed wear and life. Also, one aspect of various embodiments of the invention is that the transition-to-turbine seal 300, by extending further into the hot gas path 352, protects the front face of the row 1 vane segment 330 from more direct exposure to high temperatures and consequent wear.

Figure 5:
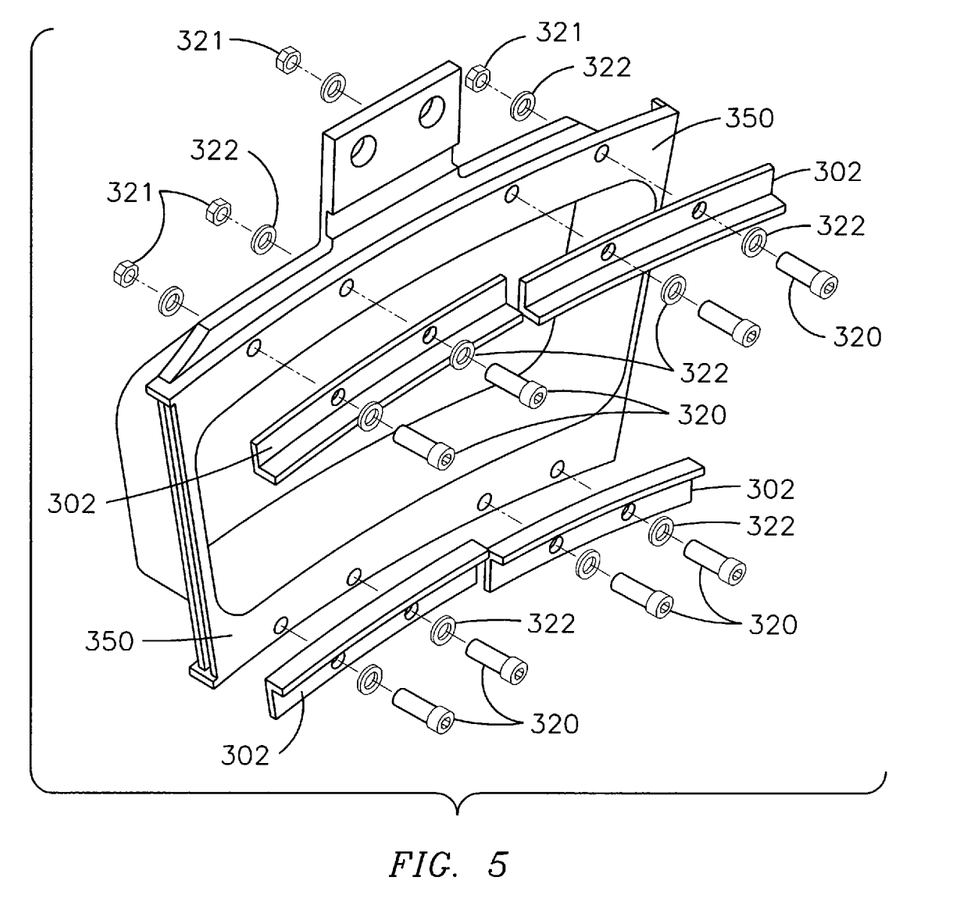
FIG. 5 provides an exploded perspective view of two transition exit seals extending across each of the inner and outer transition exit rails of a transition.

Further to the transition exit seal 302, the bolted attachment to the transition exit rail 350 eliminates wear of the latter part. In one embodiment, two bolts are provided for each transition exit seal 302, and two transition exit seals 302 extend across each of the inner and outer transition exit rails 350 (see FIG. 5). To better assure stability of the transition exit seals 302, one appropriately selects bolts 320, nuts 321 and washers 322. Washer 322 options may include NORD-LOCK®-type self-locking, Belleville-type or tab types. FIG. 5 depicts such embodiment in a perspective exploded view.

Figure 6:
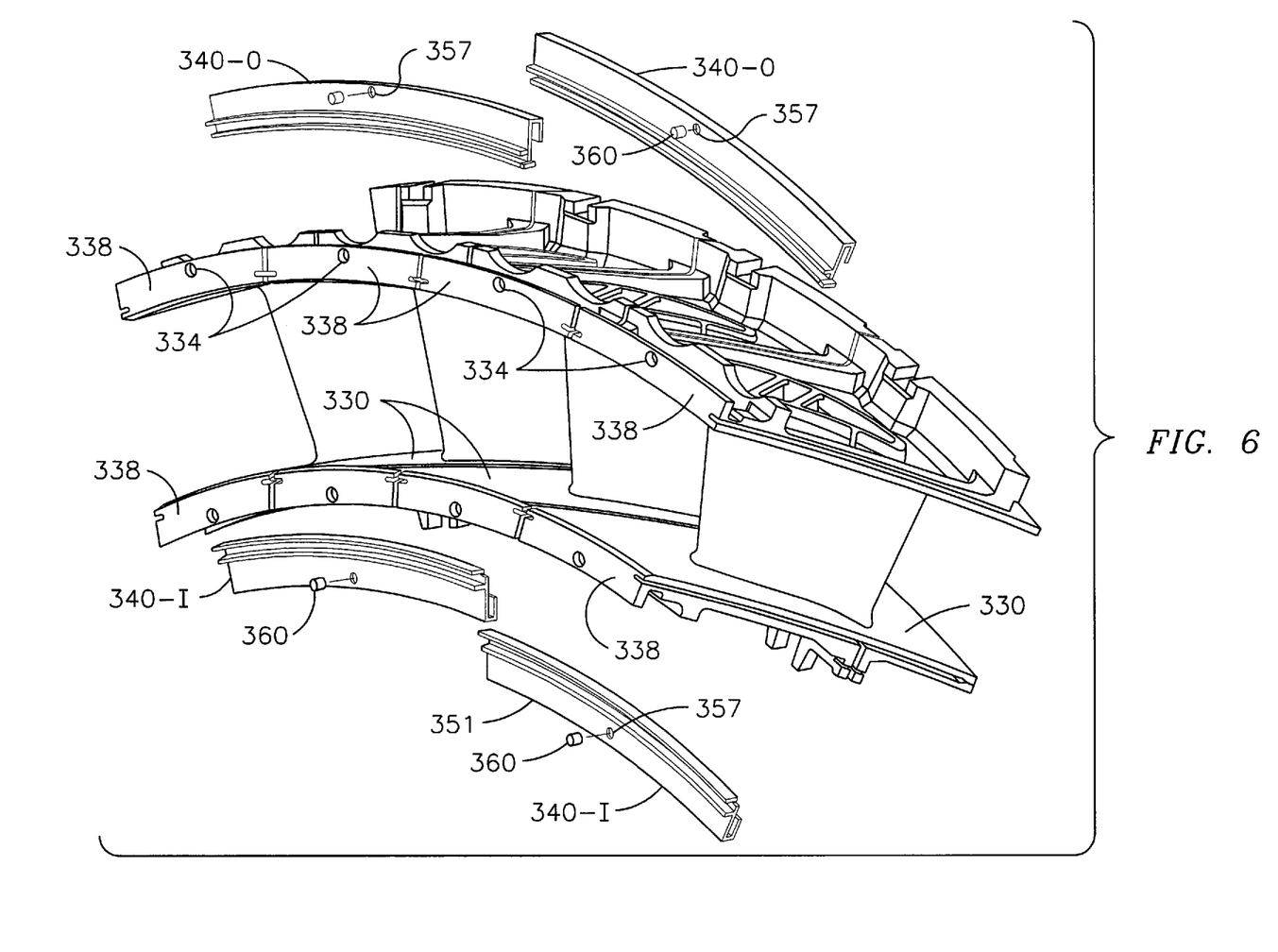
FIGS. 6 and 7 respectively provide exploded and assembled perspective views of two outer stage-1 seals and two inner stage-1 seals as they may be installed onto four adjacent row 1 vane segments.

Although the transition exit seals 302 are solidly affixed to the transition exit rails 350, such as by bolting as discussed above, the stage-1 seals 340 are free floating in relation to the adjacent stage-1 vane segments 330. Installation and maintenance of position during operation therefore are of concern, and may be resolved through incorporation of aspects of an assembly approach depicted in FIGS. 6 and 7, and a physical feature depicted in FIG. 8. FIG. 6 depicts an assembly, exploded view of four adjacent row 1 vane segments 330, two outer stage-1 seals 340-O and two inner stage-1 seals 340-I. In FIG. 6 are viewable holes 334 disposed along respective plates 338 of the row 1 vane segments 330. A single hole 357 centered along wall 351 of each stage-1 seal 340 aligns with one of said holes 334, and receives a fugitive fastener 360 that also engages one of the holes 334 to fasten the parts as shown in the assembled view in FIG. 7. The fugitive fastener 360 positions the stage-1 seal 340 (inside or outside) to a respective row 1 vane segment 330. By "fugitive fastener" is meant a fastener that decomposes as temperature elevates to operational temperatures; such fasteners are employed to provide for fastening during assembly procedures where freedom of movement beyond such fastening is desired during operation. One example of a fugitive fastener is a wooden dowel.

Figure 7:
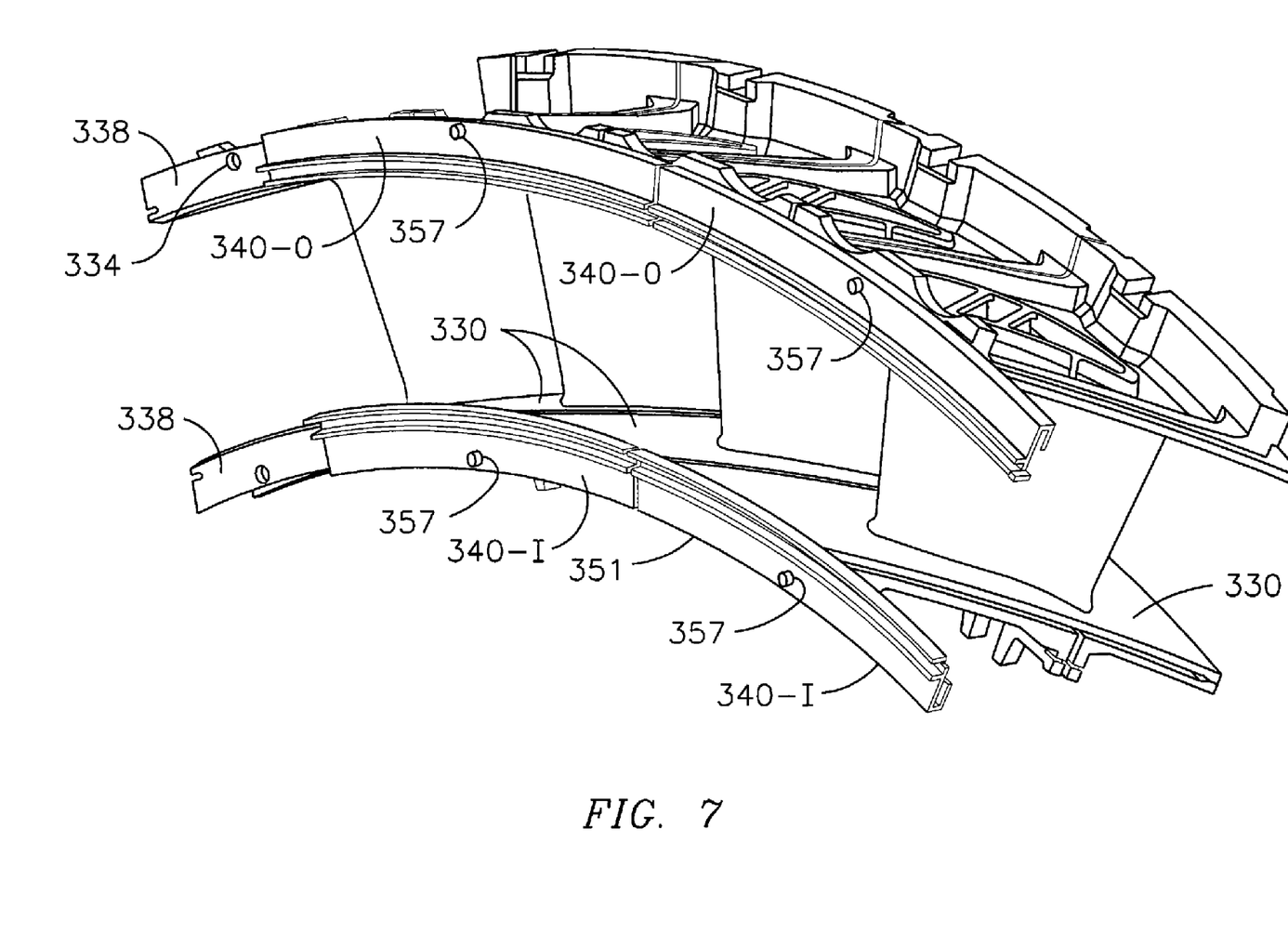

As viewable in FIGS. 6 and 7, the stage-1 seals 340-O and 340I may be aligned in an offset fashion in relation to the row 1 vane segments, so that two adjacent stage-1 seals join along a face of a row 1 vane segment rather than along a junction of two adjacent row 1 vane segments. This is believed to reduce undesired air leakage into the hot gas path.

Figure 8:
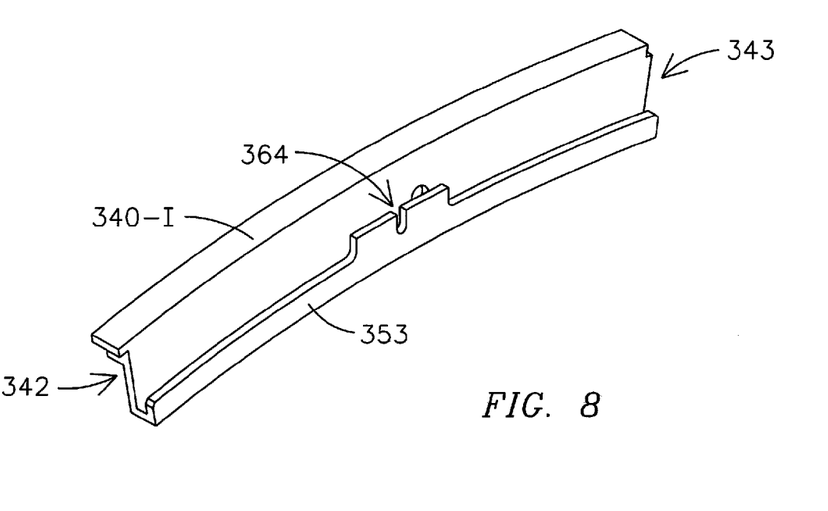
FIG. 8 provides one example of a lap-type joint configuration at the ends of a curved stage-1 seal, comprising a lap joint first end at one end and a lap joint second end at an opposite end the stage-1 seal.

Also relevant to undesired air leakage is the provision, in various embodiments, of a lap or other type of flow-restrictive joint as is known to those skilled in the art. FIG. 8 provides one example, not to be limiting, of one joint, a lap joint comprising a lap joint first end 342 and a lap joint second end 343 at opposite ends of stage-1 seal 340. Joining of adjacent stage-1 seals 340 comprising overlapping lap joint first ends such as 342 and lap joint second ends such as 343 reduce leakage through the junctions of such components. Joints such as these are effective to reduce overall air flow leakage into the hot air bulk stream and accordingly improve seal performance characteristics. A curvature of the stage-1 seal is noted; this conforms to the arcuate shape of the row-1 vane segments to which this attaches. However, transition exit seals and stage-1 seals may be linear or may have any desired curvilinear shape, and are not meant to be limited by such depiction of this embodiment.

Also, a stage-1 seal may comprise a recess slot to receive the shaft of a pin that is fit into a row 1 vane segment. This is done to provide a "safety stop" to prevent rotation of the stage-1 seal during operation. For example, FIG. 8 depicts a view from the downstream side of wall 353 depicting a recess slot 364 into which a pin (not shown) projects that also passes through a hole in a row 1 vane segment (not shown). Referring to FIG. 4, a pin 362 is depicted in cross section, partly positioned within the region of the radial seal slot 354. It is appreciated that for gas turbine engines comprising a plurality of combustion chambers and transitions disposed radially about a central axis such as defined by the shaft 112 of FIG. 1, an anti-rotation mechanism serves the purpose of retaining the multiple stage-1 seals in their intended positions along the row 1 vane segments.

Based on the above description, some embodiments of the present invention may comprise a seal kit for a gas turbine engine, the seal kit comprising: a first member, for example a transition exit seal, comprising a male member; a second member, for example a stage-1 seal, comprising a first female member adapted to receive the male member and a second female member adapted to receive a male member of a row 1 vane segment of the gas turbine engine; and a fugitive fastener for affixing the stage-1 seal to the row 1 vane segment. In some such kit embodiments, transition exit seal first members and stage-1 seal second members are provided both for the inner and the outer edges of the transition and the row 1 vane segment. Also, in some such kit embodiments, two transition exit seals are provided to span the width of one transition, and a single stage-1 seal covers two or more row 1 vane segments.

Further, while it is appreciated that kits for maintenance may only comprise the aforementioned components, kits for initial changeover to designs comprising embodiments of the present invention may also comprise one or more transitions and one or more row 1 vane segments adapted for mating connection (e.g., fixed attachment for the transition, and sliding radial contact for the row 1 vane segment).

Still further, it is appreciated that kits may comprise various arrangements, such as depicted in FIGS. 10-13 and disclosed herein. For example, a first sealing function may be provided by a transition exit seal comprising two parallel walls into which fit a male member of the stage-1 seal (see FIG. 10 and accompanying discussion).

Figure 9:
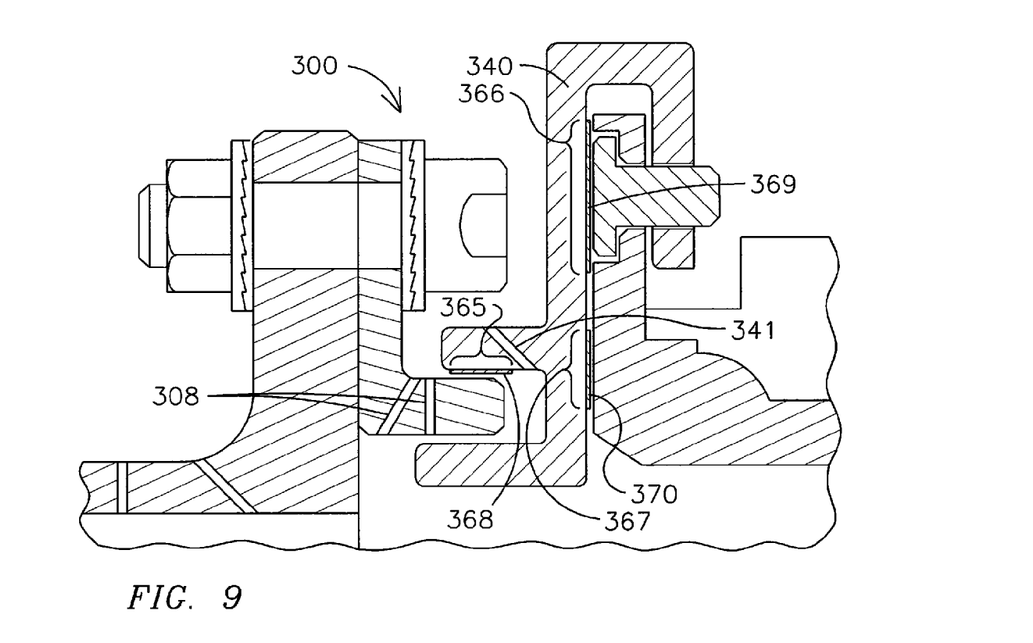
FIG. 9 is a cross section view of a transition-to-turbine seal that depicts three surface areas known to experience higher relative wear.

Some embodiments of the transition-to-turbine seal may additionally comprise a material applied to or added to a surface of a male member/female member interface to reduce vibration. For example, such material may be selected from the group consisting of a felt metal, such as a sprayed on slightly compressible metal layer, a cloth metal, such as may be attached by braze welding or resistance spot welding, or a rope seal, which may comprise ceramic or other compositions. Wear resistant coatings, as are known to those skilled in the art, also may be utilized on one or more wear surfaces. When a ceramic rope seal is utilized, the ceramic may either be inside or outside of the metal component, and likewise the metal may appear on the inside or the outside of the rope seal. FIG. 9, a cross section of transition-to-turbine seal 300, depicts three surface areas 365, 366 and 367 of the stage-1 seal 340 known to experience higher relative wear where such material may be applied or added. Sections of cloth metal material 368, 369 and 370 are depicted in FIG. 9 as covering these three surface areas 365, 366 and 367. In various embodiments, one or more of such sections 368, 369 and 370 may be applied. More generally, it is appreciated that the surfaces on which these materials are applied need not be the surfaces exposed to the heaviest mechanical load contacts. Rather, given the dynamics of the seal contact surfaces throughout operations of the turbine, the areas receiving this material may simply be the areas of greatest contact and/or susceptibility to fretting wear due to complex vibrational dynamics. Providing such material therefore may reduce the floating of the seal, and therefore reduce the hammering type wear on the seal.

It is noted that the need to cool with the effusion holes, such as 308 and 341 in FIG. 9, depends on the choice of material, design, and other factors. When section(s) of a material such as cloth metal is/are added to reduce vibration and wear on one of the surfaces as described above, this addition will reduce the passage of cooling air through the serpentine path defined by the male member/female member interface. Accordingly, for such embodiments, a greater number and/or size of effusion holes may be provided for component and other cooling.

Further to the materials that may be used for seal components, materials and coating are selected to survive the expected maximum temperature and to generally meet the service life requirements. Oxidation loss is a known concern, and materials are selected that provide an acceptable oxidation loss at a specified maximum temperature. One possible combination of materials is for the transition exit seal to comprise an alloy such as a cobalt-based alloy (e.g., X45 alloy), and for the stage-1 seal to comprises a nickel-chromium-iron-molybdenum alloy (e.g. HASTELLOY® X alloy). In such embodiment the row 1 vane surface in contact with the stage-1 seal would comprise a material harder than the material of the stage-1 seal. Also, a cobalt based coating is less likely to wear due to the nature of their oxides having a lubricious quality. For example, a Ni—Cr—$Cr_2O_3$ based material with additions of silver and $BaF_2$/$CaF_2$ lubricants may be applied by plasma spraying to one side of a metal-metal couple to provide improved wear behavior compared to bare metal couples. The mechanism of wear improvement is believe to be due to the thermally induced migration (or diffusion) of the lubricant species to the contact surface. This is believed to provide solid state lubrication and a commensurate reduction in wear during sliding. Use of relatively lower cost base metals for the seal components may be allowed by proper selection of a suitable lubricious coating, or other wear resistant coating as is known to those skilled in the art, over such metal.

Although the embodiments disclosed and depicted herein comprise a male member of a first member (e.g., transition exit seal) that engages a female member of a second member (e.g., stage-1 seal), this is not meant to be limiting. For example, a first member of a transition-to-turbine seal that is adapted for fixed attachment to the transition may comprise a slot, such as an axial seal slot, and the mating part of a second member may comprise a male member that engages that slot to provide a first sealing function. Similarly, other embodiments may be provided where the axial and radial sealing functions are arranged differently than those disclosed herein.

Also, other aspects of the specific embodiments disclosed and depicted above are not meant to be limiting. For example, it is appreciated that the transition exit seal may be fastened with any type of fastener known in the art, for example with clamps or brackets, rather than by bolts and nuts, and may also be made integral with the transition, such as by welding. Such transition exit seals, even when the fixed attachment is by welding, are considered renewable in that during replacement, an older welded-on transition exit seal may be removed by standard means and a new exit seal may be fixedly attached by welding to the transition (such as to the transition exit rail).

Figure 10:
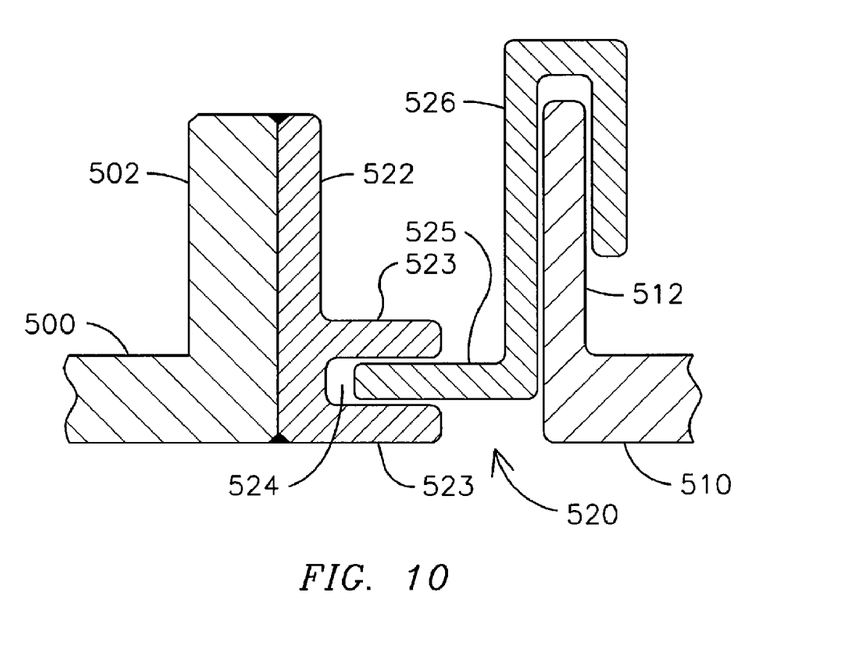
FIGS. 10-13 provide schematic cross-section partial views of alternative arrangements of a transition-to-turbine seals in relation to partial views of adjacent transitions and row 1 vane segments.
Figure 11:
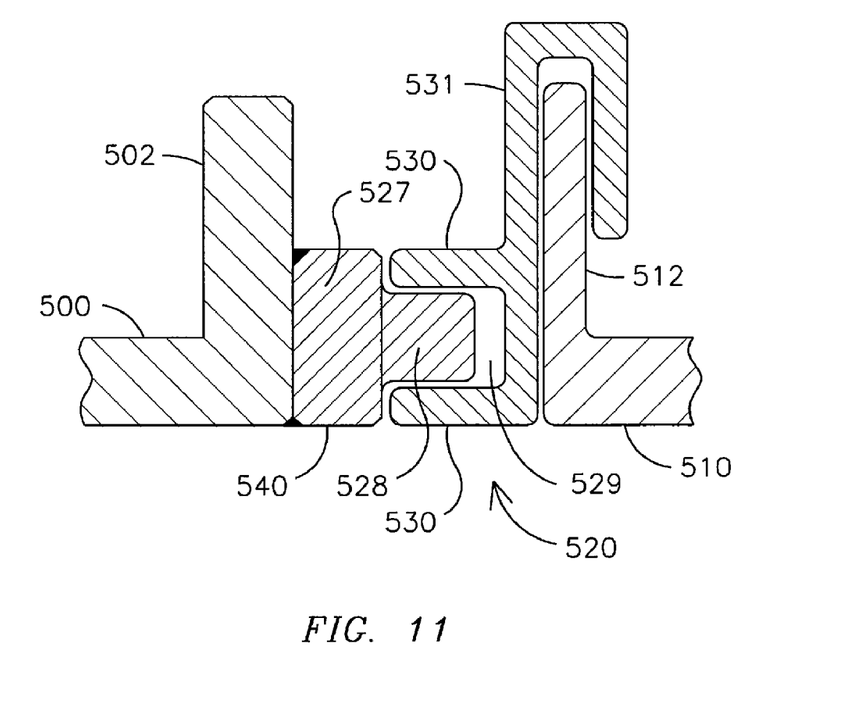
Figure 12:
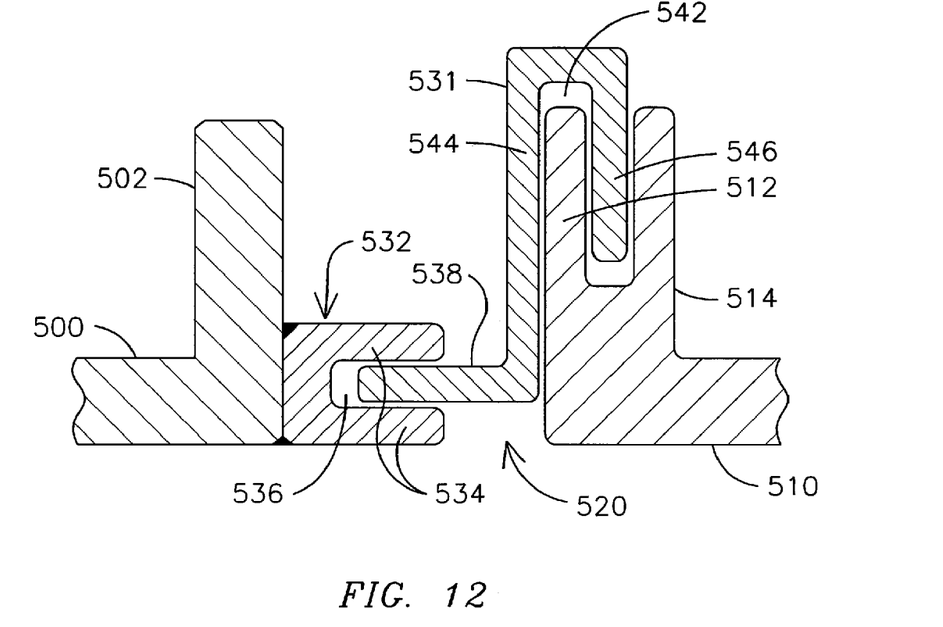
Figure 13:
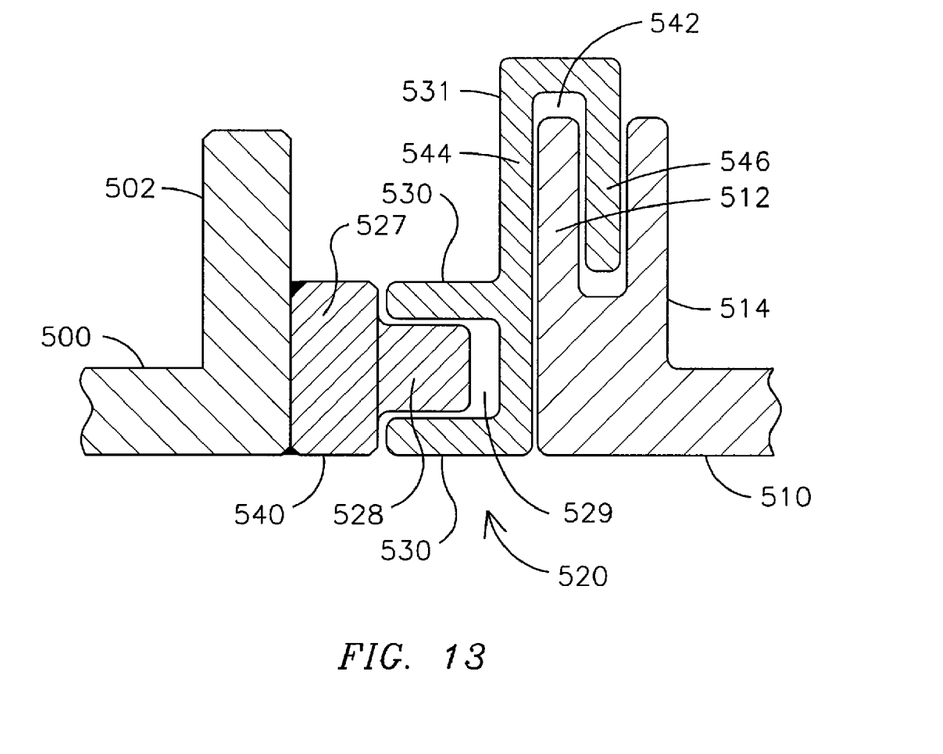

Examples of such different arrangements and attachment means are provided in FIGS. 10-13, which are cross-sectional schematic representations that each comprise a downstream section of a transition 500, comprising a transition exit rail 502, an upstream portion of a row 1 vane segment 510 comprising a leading edge rail structure 512, and various embodiments of a transition-to-turbine seal 520. In FIG. 10 a transition exit seal 522 of the transition-to-turbine seal 520 is welded, rather than bolted to the transition exit rail 502. Also, rather than comprising a male member in axial orientation, two parallel walls 523 are provided, which form an axial seal slot 524, and the latter forms an axially disposed seal with a male member 525 of a stage-1 seal 526 component of the transition-to-turbine seal 520. An alternative renewable transition exit seal 540 in FIG. 11 also is welded, and comprises an axial male member 528 attached to a base 527. Similar to previously discussed embodiments, the male member 528 forms an axially disposed seal with an axial seal slot 529 that comprises two parallel spaced apart walls 530, which are components of a stage-1 seal 531. In FIG. 12, a transition exit seal 532 is welded to transition exit rail 502, and comprises two parallel walls 534 which form an axial seal slot 536; the latter forms an axially disposed seal with the male member 538 of stage-1 seal 531 component of the transition-to-turbine seal 520. The stage-1 seal 531 also comprises a radial seal slot 542 formed between two parallel walls 544 and 546. It is noted that the row 1 vane segment 510 comprises an additional wall 514 parallel to the leading edge rail structure 512, and these form a seal around wall 546. This is not meant to be limiting. Finally, FIG. 13 comprises the axial male member 528 attached to a base 527 as disclosed in FIG. 11, which forms an axially disposed seal with an axial seal slot 529 that comprises two parallel spaced apart walls 530, which are components of stage-1 seal 531. The embodiment depicted in FIG. 13 also comprises the radial seal slot 542 formed between two parallel walls 544 and 546 of stage-1 seal 531, and the row 1 vane segment 510 that comprises an additional wall 514 parallel to the leading edge rail structure 512, forming an additional seal around wall 546.

Thus, a first sealing function between a transition exit seal such as 522, 532, 540 and a stage-1 seal such as 526, 531 may be achieved by any of the arrangements depicted in FIGS. 10-13, and likewise a second sealing function between a stage-1 seal such as 526,531 and a row 1 vane segment such as 510 may be achieved by any of the arrangements depicted in FIGS. 10-13.

It is noted that various embodiments, including embodiments such as those disclosed and depicted herein, do not comprise a brush seal component. That is, the present invention in various embodiments is not adaptable for use with a brush seal, such as a brush seal comprising bristles for flexible mating with a second component, as is described in aforementioned U.S. Pat. No. 5,265,412.

As used herein, the term "hole," such as an effusion hole or a bolt hole, is not meant to be limited to a round aperture through a body as is illustrated in any embodiment depicted in the figures. Rather, the term "hole" is taken to mean any defined aperture through a body, including but not limited to a slit, a slot, a gap, and a groove.

As disclosed herein, the transition-to-turbine seal functions as a "floating seal." Also, this seal is designed to ensure the flow path experiences a gradual step increase from the transition exit to the row-1 vane. The seal also could help protect the leading edge of the row-1 vane from excessive temperature by physically blocking and/or directing the flow. Due to the complexity and multiple component interfacing, as apparent from analysis of the various figures, acceptability analysis includes consideration of start-up, base load, and shut down/trip conditions. The transition exit and the R1 vane seal components must respond effectively and exhibit wear and flow passage patterns that, overall, are found acceptable during all these conditions, and transitions therebetween.

Also, the term "means for making sliding seal contact" is taken to include all of the above structural combination embodiments for effectuating sliding engagement between contacting slidably engaging components of the transition-to-turbine seal. The means for making sliding seal contact includes all of the embodiments disclosed and discussed for the interfacing of the transition exit seal with the stage-1 seal, and the interfacing of the stage-1 seal with the row 1 vane segment (or structural equivalents thereof). One example of such means for making sliding seal contact is the combination of the first male member of the transition exit seal and the axial slot of the stage-1 seal.

Further, it is appreciated that the axial interface of the transition exit seal male member and the stage-1 axial seal slot are designed to provide engagement as the stage-1 seal spans multiple transition exit seal segments without transmitting load to adjacent components (such as the row 1 vane segments and transition). For any particular gas turbine engine, specific worst case distortion modeling may establish the dimensions and tolerances that provide for axial movement without binding and that do not comprise excessive gaps and consequent excessive air leakage. Thus, embodiments of the transition-to-turbine seal allow axial and radial freedom of movement for each row 1 vane segment.

Thus, embodiments of the present invention provide a compliant and robust transition-to-turbine seal that, through its preferential wear aspects, provides extended life to the adjacent transition and row 1 vane segments.

All patents, patent applications, patent publications, and other publications referenced herein are hereby incorporated by reference in this application in order to more fully describe the state of the art to which the present invention pertains, to provide such teachings as are generally known to those skilled in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A transition-to-turbine seal for sealing a gap between an outlet of a gas turbine engine transition and a row 1 vane segment, the transition comprising a radially extending exit rail as its downstream end, and the turbine row 1 vane segment comprising a radially disposed leading edge rail as its upstream end, the transition-to-turbine seal comprising:
   a transition exit seal adapted for fixed attachment to a downstream radial surface of the radially extending exit rail of the transition outlet;
   a stage-1 seal cooperatively associated with the transition exit seal to provide a first sealing function with an axial freedom of movement, and a wear surface adapted for sliding radial contact with a surface of the radially disposed leading edge rail of the row 1 vane segment to provide a second sealing function, wherein the wear surface comprises a material selected to promote preferential wear of the wear surface relative to wear of the surface of the radially disposed leading edge rail of the row 1 vane segment during sliding contact there between.

2. The transition-to-turbine seal of claim 1, wherein the transition exit seal comprises a male member for sliding engagement with an axial seal slot of the stage-1 seal, such sliding engagement providing the first sealing function.

3. The transition-to-turbine seal of claim 1, wherein the stage-1 seal comprises a radial seal slot that comprises the wear surface.

4. The transition-to-turbine seal of claim 3, wherein the transition exit seal comprises a male member for sliding engagement with an axial seal slot of the stage-1 seal, such sliding engagement providing the first sealing function.

5. A gas turbine engine comprising the transition-to-turbine seal of claim 4.

6. The transition-to-turbine seal of claim 1, wherein the transition exit seal comprises two or more holes adapted to receive bolts for the fixed attachment to the transition outlet.

7. The transition-to-turbine seal of claim 1, wherein the transition exit seal comprises an axial seal slot for sliding engagement with a male member of the stage-1 seal, such sliding engagement providing the first sealing function.

8. The transition-to-turbine seal of claim 7, wherein the transition exit seal additionally comprises a plate for contacting a transition rail of the transition outlet, and the plate comprises two or more holes adapted to receive bolts for the fixed attachment to the transition rail.

9. A gas turbine engine comprising the transition-to-turbine seal of claim 1.

10. A seal kit for a gas turbine engine, for sealing a gap between an outlet of a transition and a row 1 vane segment of a gas turbine engine, the transition comprising a radially extending exit rail as its downstream end, and the turbine row 1 vane segment comprising a radially disposed leading edge rail as its upstream end, the seal kit comprising:
   a transition exit seal comprising a male member extending axially downstream from a downstream radial surface of the radially extending exit rail;
   a stage-1 seal comprising a first female member adapted to receive the male member and a second female member adapted to receive a male member of the radially disposed leading edge rail of the row 1 vane segment of the gas turbine engine; and a fugitive fastener for positioning the stage-1 seal to the row 1 vane segment.

11. The seal kit of claim 10, wherein the first female member comprises an axial seal slot and the second female member comprises a radial seal slot disposed perpendicularly to the first female member.

12. The seal kit of claim 10, comprising for a transition of a gas turbine engine two transition exit seals for an inner exit rail and two transition exits seals for an outer exit rail of the transition.

13. The seal kit of claim 10 wherein the stage-1 seal comprises overlapping ends effective to reduce passage of air there through.

14. The seal kit of claim 13 wherein the overlapping ends comprise, when joined to adjacent second stage-1 seals, lap joints.

15. The seal kit of claim 10, additionally comprising a transition for attachment to the transition exit seal and a row 1 vane segment adapted for mating connection with the stage-1 seal.

16. A transition-to-turbine seal for a gas turbine engine comprising a hot gas path passing through a transition to a turbine row 1 vane segment, the transition comprising a radially extending exit rail as its downstream end, and the turbine row 1 vane segment comprising a radially disposed leading edge rail as its upstream end, the transition-to-turbine seal comprising:
   a first member comprising a first bar extending axially downstream from a downstream radial surface of the radially extending exit rail; and
   a second member comprising a first, axial seal slot adapted to receive the first bar and formed between a first wall comprising a first outer surface exposed to the hot gas path and a second opposing wall comprising a second outer surface not so exposed, the second member additionally comprising a radial seal slot disposed radially away from the hot gas path and adapted to receive the row 1 vane segment radially disposed leading edge rail, the radial seal slot formed between a first transverse wall that communicates with the second opposing wall and a second transverse wall shorter than the first transverse wall.

17. The transition-to-turbine seal of claim 16, wherein the first outer surface comprises a thermal barrier coating.

18. The transition-to-turbine seal of claim 16, wherein the first member additionally comprises a second bar adapted for fixed attachment to the downstream radial surface of the radially extending transition exit rail.

19. The transition-to-turbine seal of claim 18, wherein the second bar comprises two or more holes adapted to receive bolts for the fixed attachment to the transition exit rail.

20. A transition-to-turbine seal for sealing a gap between an outlet of a transition and a row 1 vane segment of a gas turbine engine, the transition comprising a radially extending exit rail as its downstream end, and the turbine row 1 vane segment comprising a radially disposed leading edge rail as its upstream end, the transition-to-turbine seal comprising:
   a transition exit seal adapted for fixed attachment to a downstream radial surface of the radially extending exit rail transition outlet; and
   a stage-1 seal contacting the transition exit seal and the radially disposed leading edge rail of the row 1 vane segment,
   wherein a first means for making sliding seal contact is provided where the transition exit seal contacts the stage-1 seal, and a second means for making sliding seal contact is provided where the stage-1 seal contacts the radially disposed leading edge rail of the row 1 vane segment.

* * * * *